United States Patent Office 3,193,356
Patented July 6, 1965

3,193,356
METHOD FOR DETERMINING THE PRESENCE OF STRONG ACIDS IN OILS
Melvin I. Smith, Rockville Centre, N.Y., Thomas J. McKeon, Cresskill, N.J., and Louis H. Sudholz, Flushing, N.Y., assignors to Socony Mobil Oil Company, Inc., a corporation of New York
No Drawing. Filed Mar. 28, 1962, Ser. No. 183,058
4 Claims. (Cl. 23—230)

This invention relates to a method of and apparatus for testing oil to determine immediately if it should be replaced before engine damage occurs. The invention particularly relates to a "Go—No Go" test for dangerous acidity in used marine engine oils.

When strong acids from fuel combustion contaminate crankcase oils, extensive corrosion can occur. This is particularly true in marine diesel engines since the heavy fuel used in these engines generates strong acids during combustion and hence oil contamination with these acids can occur to a substantial degree. Crankshafts can be severely damaged by these strong acids, such as sulfuric acid or hydrochloric acid, and their repair is costly and time consuming. Furthermore, it is believed that hardened tin-base babbit bearings, used in marine diesel engines, are damaged by the presence of substantial amounts of strong acids in the oil.

Ship operators and marine engineers are, of course, aware of the danger of accumulating excessive amounts of strong acids in the oil. But, unfortunately, no simple, convenient method of determining the presence of a harmful amount of these acids has heretofore been available. The American Society for Testing Materials prescribed a procedure for determining the presence of strong acids, ASTM D–664, but this procedure is far too complicated to be performed aboard ship. Therefore, an oil sample must be taken and shipped to a commercial laboratory. By the time the results are relayed back to the ship, extensive damage may be done. Furthermore, the presence of some strong acids is not harmful unless these acids are at a level over 0.05 SAN (Strong Acid Number) by the ASTM D–664 test procedure. At or below this level no damage to the engine parts will occur but above this level serious damage may occur.

It is an object of this invention to provide a method of and apparatus for testing used engine oil for the presence of serious amounts of strong acids.

It is a further object of this invention to provide a simple test procedure and apparatus for testing used engine oil to determine immediately if the oil should be replaced.

It is a further object of this invention to provide a simple "Go—No Go" test procedure and apparatus for use on a ship to determine immediately if the oil in use contains dangerous amounts of strong acids requiring its replacement.

These and other objects of the invention will be disclosed in more detail hereinafter.

The invention here involves an indicator which has incorporated in it a base in sufficient amount to prevent any indication of acid or color change until a SAN (ASTM D–664 Test) of more than 0.05 is reached. In the particular solution used, enough potassium hydroxide is added to maintain a blue color until SAN of .05 is exceeded, at which point the color will change to green, when the oil is considered "borderline," and yellow when the oil is considered unsatisfactory. In the preferred form of the invention, a prescribed amount of kerosine or heptane is added with the indicator solution in order to thin the oil and facilitate contact with the indicator.

In order to make the necessary tests on board ship, a kit is provided with test bottles and test ingredients. A sample of the used oil is poured into a graduated vial, the indicator solution of this invention is added, and the mixture is shaken vigorously. The color of the separated water layer is then observed by transmitted light. A color comparison chart is provided with the kit for easy interpretation.

The preferred indicator is (Bromo Cresol Green Indicator) the sodium salt of tetra-brom-m-cresol-sulfonphthalein. This material may be obtained as a dry powder from Matheson Coleman & Bell Division of Matheson Co. Inc. A solution of this material is prepared by dissolving 0.25 g. of the water soluble Bromo Cresol Green indicator in a sufficient amount of water to make 50 ml. of the solution.

A potassium hydroxide solution is prepared by dissolving 6 g. of potassium hydroxide pellets in a sufficient amount of water to make a liter of the solution. The base is adjusted with water so that 1 ml. is equivalent to $4.0 \pm 0.1$ mg. of potassium hydroxide.

The indicator solution is then made by adding 10 ml. of the Bromo Cresol Green concentrate to 100 ml. of distilled water. Exactly 2 ml. of the potassium hydroxide solution is added and sufficient distilled water is added to make a liter.

The final composition of the indicator solution is 0.005% by weight Bromo Cresol Green, 0.0008% by weight potassium hydroxide and the balance water.

TEST PROCEDURE

The following test procedure is followed after a sample of used oil has been taken, using scribed vials provided with the test kit and scribed at volume A=4.5 cc., volume B=29.5 cc. and volume C=34.5 cc. (volume C=4.5 +25+5, total 34.5).

(1) Shake sample to be tested to insure a homogeneous mixture.

(2) Pour sample into test vial to point marked "A."

(3) Add color Indicator Solution to the vial to the point marked "B."

(4) Add kerosine to the vial to the point marked "C."

(5) Shake contents of the vial vigorously for at least one minute and allow to settle.

(6) Compare color of bottom liquid layer of vial against transmitted light using color comparator.

(7) If bottom liquid layer of vial is yellow or green, sample has a significant concentration of strong acids.

(8) If bottom liquid layer of vial is blue, sample contains no significant amounts of strong acids.

Three test techniques were used in the testing of this invention. In the first instance (Method A) a sample of the oil is mixed with a water solution of the indicator. This is classified as a non-displacement method. The other two methods (Method B and Method C) are displacement methods. In Method B an amount of alkali equivalent to a strong acid number of 0.05 in the oil is added to the color indicator solution. Method C is similar to Method B but in addition uses heptane or kerosine to aid the mixing of the oil and water.

For test purposes 77 samples of used marine engine oils were tested in accordance with Methods A, B and C. About 22% of the samples contained strong acids above the critical 0.05 level as determined by the ASTM D–664 test procedure. The data from these tests is tabulated in Table I as follows:

*Table I*

COMPARISON OF TEST METHODS VS. ASTM D–664

| ASTM D-664 | Method A (No Displacement) | | Percent Agreement |
|---|---|---|---|
| | SAN Positive | SAN Negative | |
| SAN Positive | 29 | 0 | 100 |
| SAN Negative | 15 | 33 | 70 |
| Total | 44 | 33 | 81 |

(No. column: 29, 48, 77)

| ASTM D-664 | | Method B (Displacement) | | Percent Agreement |
|---|---|---|---|---|
| Value | No. | <0.05 SAN | >0.05 SAN | |
| <0.05 | 59 | 59 | 0 | 100 |
| >0.05 | 18 | 11 | 7 | 35 |
| Total | 77 | 70 | 7 | 86 |

| ASTM D-664 | | Method C (Displacement+ Heptane) | | Percent Agreement |
|---|---|---|---|---|
| Value | No. | <0.05 SAN | >0.05 SAN | |
| <0.05 | 59 | 59 | 0 | 100 |
| >0.05 | 18 | 7 | 11 | 59 |
| Total | 77 | 66 | 11 | 91 |

As seen from the data in Table I, the Method A indicates strong acids when their amount is very small, and even when they are not found at all by ASTM D–664 test procedure. Method B shows the improved results obtained in accordance with the method of this invention. Method C shows even further improvement to be obtained by adding heptane or kerosine to the solution to aid in bringing the acids into contact with the indicator solution. As seen in the test results reported above, Method B and Method C show good agreement with the complicated ASTM D–664 test procedure and are acceptable for shipboard tests which can be conducted by inexperienced operators. They do not indicate strong acids below the critical level of 0.05 and yet do show the presence of these acids above this critical level when their presence would be harmful to the engine.

The examples given hereinabove are for the purpose of illustrating this invention and are not intended to limit the invention. The invention is to be construed broadly, being limited only by the following claims.

We claim:

1. A method for determining the presence of dangerous amounts of strong acids in used oil from marine engines and the like which comprises mixing an amount of used oil with an indicator which will change color in the presence of strong acids, said indicator containing a sufficient amount of basic material so that when mixed with acid oil no color change occurs unless the oil contains a strong acid number of at least about 0.05, the oil being free of dangerous amounts of strong acids if the color remains unchanged and said oil containing dangerous amounts of strong acids requiring its replacement or treatment if the color is changed.

2. The method of claim 1 wherein a compound selected from the group consisting of kerosene and heptane is added with the indicator to improve the contact of the indicator with any strong acids present in the used oil.

3. A method for determining the presence of dangerous amounts of strong acids in used oil from marine engines and the like which comprises mixing in proportions of about 4.5 cc. of used oil with about 25 cc. of an indicator solution containing about 0.005% by weight Bromo Cresol Green, about 0.0008% by weight potassium hydroxide and the balance water, whereby if the color of the indicator solution remains blue the oil is satisfactory for continued use but if the color changes to green or yellow the oil must be replaced.

4. The method of claim 3 further characterized in that 5 cc. of a compound selected from the group consisting of kerosene and heptane is added to the mixture.

References Cited by the Examiner

UNITED STATES PATENTS

| | | | |
|---|---|---|---|
| 270,489 | 1/83 | Schubert | 23—292 XR |
| 1,674,416 | 6/28 | Taylor | 23—253 |
| 1,986,403 | 1/35 | Lehmkuhl | 23—230 |
| 2,471,861 | 5/49 | Cahn | 23—230 |
| 2,770,530 | 11/56 | Bergstrom et al. | |
| 2,953,439 | 9/60 | Elliott et al. | 23—230 |
| 3,030,190 | 4/62 | Seemann et al. | |

OTHER REFERENCES

ASTM Standards, Part 7, pages 294–302 (1958), Amer. Soc. for Testing Materials, Philadelphia, Pa.

MORRIS O. WOLK, *Primary Examiner.*